US012508593B1

(12) United States Patent
Ngo

(10) Patent No.: US 12,508,593 B1
(45) Date of Patent: Dec. 30, 2025

(54) AUTOMATIC SIZE ADJUSTING AND DAMAGE PREVENTING GLASS GRINDER AND METHOD OF GRINDING GLASS MATERIALS

(71) Applicant: Vinh Quoc Ngo, Ho Chi Minh (VN)

(72) Inventor: Vinh Quoc Ngo, Ho Chi Minh (VN)

( * ) Notice: Subject to any disclaimer, the term of this patent is extended or adjusted under 35 U.S.C. 154(b) by 0 days.

(21) Appl. No.: 18/963,928

(22) Filed: Nov. 29, 2024

(51) Int. Cl.
*B02C 1/02* (2006.01)
*B02C 1/04* (2006.01)

(52) U.S. Cl.
CPC ................ *B02C 1/025* (2013.01); *B02C 1/04* (2013.01)

(58) Field of Classification Search
CPC .............. B02C 1/025; B02C 1/04; B02C 1/10
See application file for complete search history.

(56) References Cited

U.S. PATENT DOCUMENTS

2005/0082403 A1 * 4/2005 Boast ...................... B02C 1/025 241/266
2021/0138477 A1 * 5/2021 Meier ..................... B02C 1/025

FOREIGN PATENT DOCUMENTS

CN 114289162 A * 4/2022

OTHER PUBLICATIONS

English translate (CN114289162A), retrieved date Feb. 14, 2025.*

* cited by examiner

*Primary Examiner* — Mohammed S. Alawadi

(57) ABSTRACT

A glass grinder device includes a fixed vertical crushing jaw; a movable crushing jaw having two different slopes; an eccentric rotating mechanism mechanically coupled to move the movable crushing jaw in two different directions relative to the fixed vertical crushing jaw so as to grind input materials; and an adjusting mechanism mechanically coupled to move and hold the movable crushing jaw so as to prevent structural damage to the glass grinder device.

14 Claims, 8 Drawing Sheets

AUTOMATIC SIZE ADJUSTING AND DAMAGE PREVENTING GLASS GRINDER AND METHOD OF GRINDING GLASS MATERIALS

FIELD OF THE INVENTION

The present invention relates generally to jaw crushers. More specifically, the present invention relates to a glass grinding device capable of adjusting the size of the output materials and of preventing structural damage to itself.

BACKGROUND ART

Conventional jaw crushers use either single or double toggle mechanism to grind input materials such as rocks, glasses, ceramics, or other recyclable products. These jaw crushers generally include a moving jaw and a fixed vertical crushing jaw. The space between these jaws forms a V shaped tunnel. In operation, the moving jaw rotates toward and away from the fixed vertical jaw, creating compression forces on the input materials. The compression forces crush input materials into smaller and smaller pieces as they fall down this V-shaped tunnel. The single toggle mechanism uses a single toggle bar to connect the moving jaw to the remaining parts of the jaw crusher. On the other hand, the double toggle mechanism uses two toggle bars to connect the moving jaw to the remaining parts of the jaw crusher. In both mechanisms, the kinematic movements of the moving jaw and the fixed vertical crushing jaw are rough and spiky. This creates drags on the fly wheels and the motor, thus consuming a lot of power and generating wasteful heat. Furthermore, when input materials are too hard and too large for the conventional jaw crushers to handle, the toggle bars will be broken by the Newton's third law force generated by hardness of the input materials. In these situations, if the conventional jaw crusher is not stopped on time, the continual movement of the moving jaw will cause structural damage to the system itself.

To cope with this problem, many jaw crushers available in the market use pressure sensors and/or other expensive electrical sensors such as transducers or piezoelectric sensors to detect the problems and shut down the motors. These sensors increase costs and complexity. In addition, these prior-art jaw crushers have to be shut down when the problems occur and restarted after the problems are removed. They cannot automatically resume normal operation after problems have been detected and the motor has been shut down. Yet, these prior-art jaw crushers do not have a simple mechanism to adjust according to the diameters of the final products.

Accordingly, there is a need for a jaw crusher that can prevent structural damage when the input materials are hard, large, and uncrushable.

There is a need for a jaw crusher that can adjust according to the output sizes of the input materials;

There is a need for a jaw crusher that can smooth out the sharp edges of the output materials;

There is a need for a jaw crusher that can operate smoothly and efficiently without generating unwanted heat and noise;

There is a need for a grinder that can automatically resume normal crushing operation after the obstructing input materials are removed; and Yet there is a need for a grinder that is simple and inexpensive to build.

The glass grinder and method of the present invention meet the above needs and solve the above-described problems.

SUMMARY OF THE INVENTION

Accordingly, an object of the present invention is to provide a glass grinder designed to avoid damage to itself when the input materials are large and uncrushable.

Yet, another object of the present invention is to provide a glass grinder designed to adjust according to the output sizes of the materials by simple operations;

Another object of the present invention is to provide a glass grinder designed to operate smoothly and efficiently without generating unwanted heat and noise;

Another object of the present invention is to provide a glass grinder designed to automatically resumes normal crushing operation after the obstructing input materials are removed;

Another object of the present invention is to provide a glass grinder designed to smooth out the sharp edges of the output materials;

Yet another object of the present invention is to provide a glass grinder that is cost effective and easy to assemble;

Another object of the present invention is to provide a glass grinder including a fixed vertical crushing jaw; a movable crushing jaw having two different slopes (angles or gradients); an eccentric rotating mechanism mechanically coupled to move the movable crushing jaw in two different directions relative to the fixed vertical crushing jaw to grind input materials; and an adjusting mechanism mechanically coupled to slide and hold the movable crushing jaw when the input materials are large and uncrushable, whereby structural damage to the glass grinder is prevented.

Finally, another object of the present invention is to provide a method of grinding input materials such as glasses, ceramics, quarries, or rocks that comprises inputting input materials to be grinded into a mouth of a grinder that has two different slopes (angles or gradients) formed between a movable crushing jaw and a fixed vertical crushing jaw; if the input materials have large diameters and are hard to be grinded, then sliding along the force generated by the hardness of the input materials to prevent structural damage to the glass grinder; else, grinding and smooth any sharp edges to the input materials using the glass grinder. In addition, the method includes a step of changing different sizes of output materials by changing the length of a size adjustment key.

These and other advantages of the present invention will no doubt become obvious to those of ordinary skill in the art after having read the following detailed description of the preferred embodiments, which are illustrated in the various drawing and figures.

BRIEF DESCRIPTION OF THE DRAWINGS

The accompanying drawings, which are incorporated in and form a part of this specification, illustrate embodiments of the invention and, together with the description, explain the principles of the invention.

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Within the scope of the present description, the reference to "an embodiment" or "the embodiment" or "some embodiments" means that a particular feature, structure, or element described with reference to an embodiment is comprised in at least one embodiment of the described object. The sentences "in an embodiment," "in the embodiment," or "in some embodiments" in the description do not, therefore, necessarily refer to the same embodiment or embodiments. The features, structures, or elements can be furthermore combined in any adequate way in one or more embodiments.

Within the scope of the present invention, input materials include glass, rocks, quarries, ceramics, plastics, other recyclable materials, and the combination thereof to be grinded and processed later.

The present invention provides a glass grinder and a method of grinding input materials designed to (1) prevent structural damage due to large, hard, and uncrushable materials, and (2) change the size (diameter) and smooth out the sharp edges of the grinded materials.

Figure 1:
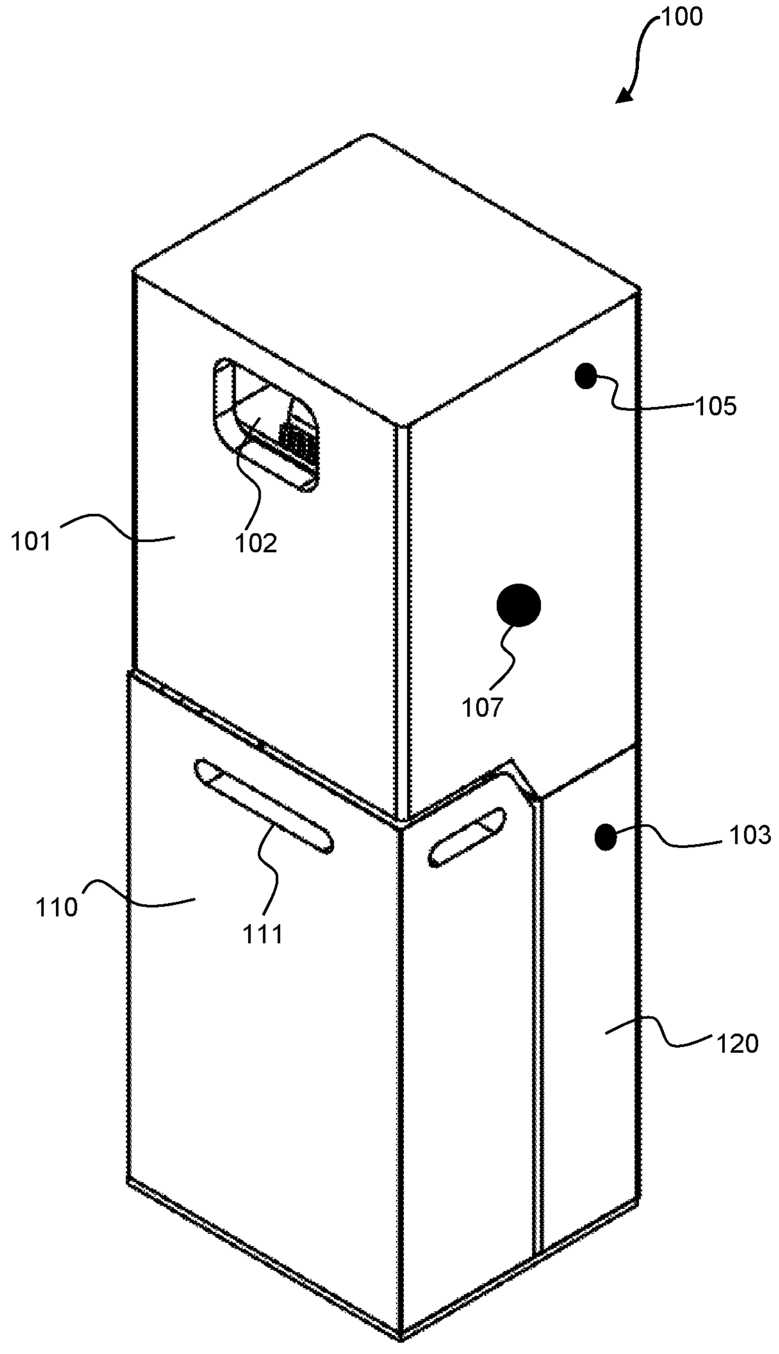
FIG. 1 is a three dimensional (3D) overview of a glass grinder capable of adjusting the size of the output materials and of preventing structural damage in accordance with an exemplary embodiment of the present invention.

Now referring to FIG. 1, an overview diagram showing the housing of a glass grinder 100 in accordance with an exemplary embodiment of the present invention is illustrated. Glass grinder 100 includes a compression chamber 101 removably stacked on top of an output container 110. Input materials such as glass, quarries, ceramic, plastics, or rocks are input into an input opening 102. The input materials are grinded in compression chamber 101 and collected in output container 110. A pair of handles 111, located on both sides of output container 110, is designed to facilitate the carrying and handling of output container 110. A power button 103 is in electrical communication with a motor (not shown). A light emitting diodes (LED) 105 is designed to inform the operations and/or problems with glass grinder 100. In various preferred embodiments of the present invention, LED 105 is lit when the motor is in a safety mode operation. The safe mode operation avoids structural damage to glass grinder 100 when the input materials are too hard and too large to be grinded. The electrical circuits that controls the operations of LED 105 power button 103 are well known in the art and will not be discussed herein. In some embodiments of the present invention, the size of the output materials can be changed either by replacing or adjusting size adjustment knobs 107. In some other embodiments, pair of size adjustment knobs 107 are used to adjust the size of the output materials by moving them horizontally back and forth.

Figure 2C:
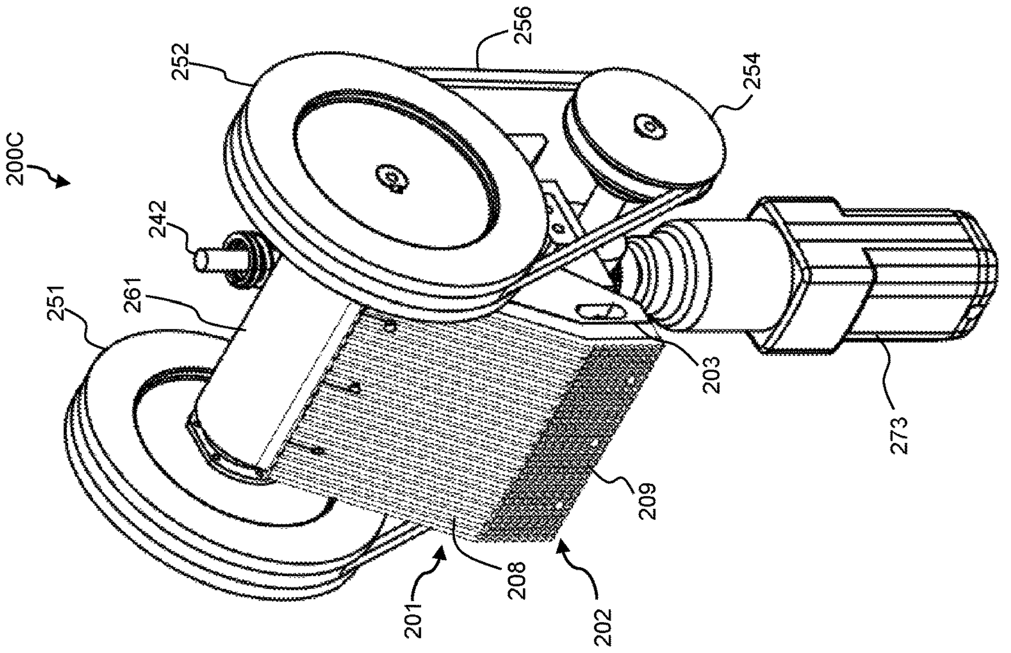
FIG. 2A-FIG. 2C illustrate the inner structure of the compression chamber of the glass grinder capable of automatically adjusting the size of the output materials and of preventing structural damage to itself in accordance with an exemplary embodiment of the present invention.
Figure 2B:
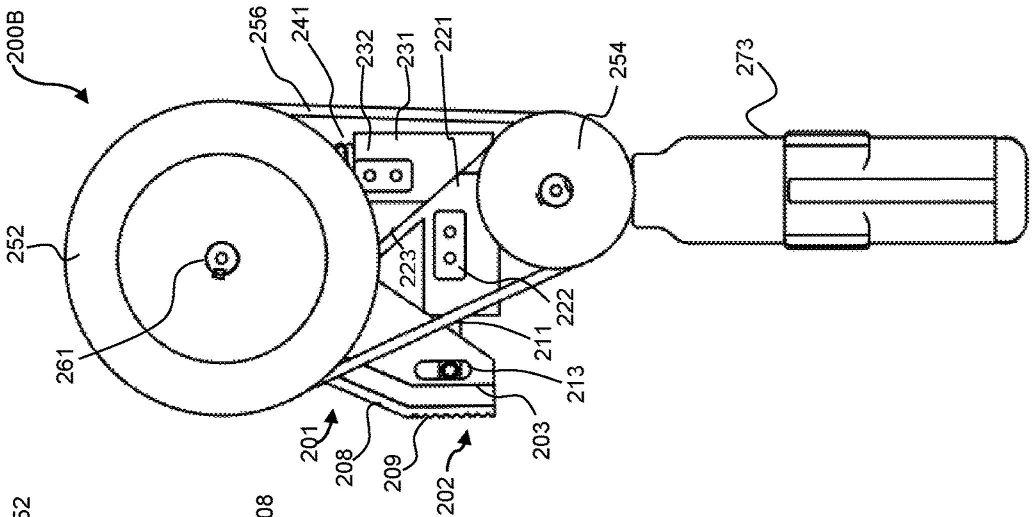
Figure 2A:
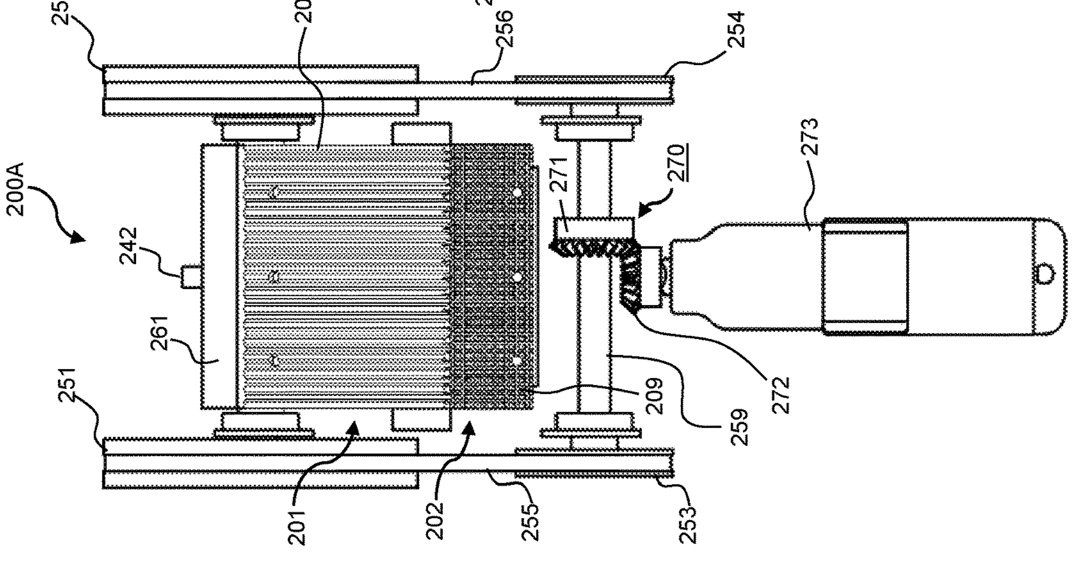

Next, referring to FIG. 2A-FIG. 2C, FIG. 2A shows a two-dimension (2D) front diagram showing the internal structure and a motor 273, FIG. 2B shows a 2D lateral diagram, and FIG. 2C shows a 3D oblique view of the internal components of compression chamber 101. Together FIG. 2A-FIG. 2C are present to show the manner the principal components of compression chamber 101 are connected together to accomplish the objectives of the present invention.

In many various aspects of the present invention, compression chamber 101 includes a movable crushing jaw 203 equipped with a first section 201 and a second section 202. First section 201 and second section 202 have different slopes (angles or gradients) relative to a fixed vertical crushing jaw (see FIG. 3). In other words, first section 201 forms a different angle than that of second section 202 with respect to fixed vertical crushing jaw. At the back of movable crushing jaw 203, a toggle bar 211 is connected between movable crushing jaw 203 and first adjusting structure 221. A second adjusting structure 231 has a trapezoid shape and is positioned to slide on a slanted surface 223 of first adjusting structure 221. One side of second adjusting structure 231 is connected to a safety spring 241 which is inserted into a safety spring rod 242. The top end of safety spring rod 242 is fixedly fastened to compression chamber 101 by a lead screw 243. Referring to FIG. 200B, first adjusting structure 221, second adjusting structure 231, and safety spring 241 are arranged in a reversed L-shaped configuration to the right hand side of movable crushing jaw 203. The front of first adjusting structure 211 is connected movable crushing jaw 203 by toggle bar 211. FIG. 200A and FIG. 200C show a pair of fly wheels 251-252 coupled to a pair of driving wheels 253-254 via a pair of V belts 255-256. FIG. 200A and FIG. 200C show that movable crushing jaw 203 is attached to a corrugated plate 208 that forms an angle with fixed vertical crushing jaw and a granular plate 209 that is parallel to the fixed vertical jaw.

Referring again to FIG. 200A, pair of driving wheels 253-254 are connected by a main axle 259 which is connected to motor 273 by a spiral bevel gear set 271-272-270. Spiral bevel gear set 270 includes a ring 271 in gear communication with a pinion 272. As motor 273 is turned on and rotates, ring gear 271 is rotated. Ring gear 271 causes pinion 272 to rotate, which in turn, causes main axle 259 to rotate. The rotation of main axle 259 causes pair of driving wheels 253-254 to rotate. Pair of V belts 255-256 pulls to rotate pair of fly wheels 251-252.

Figure 3:
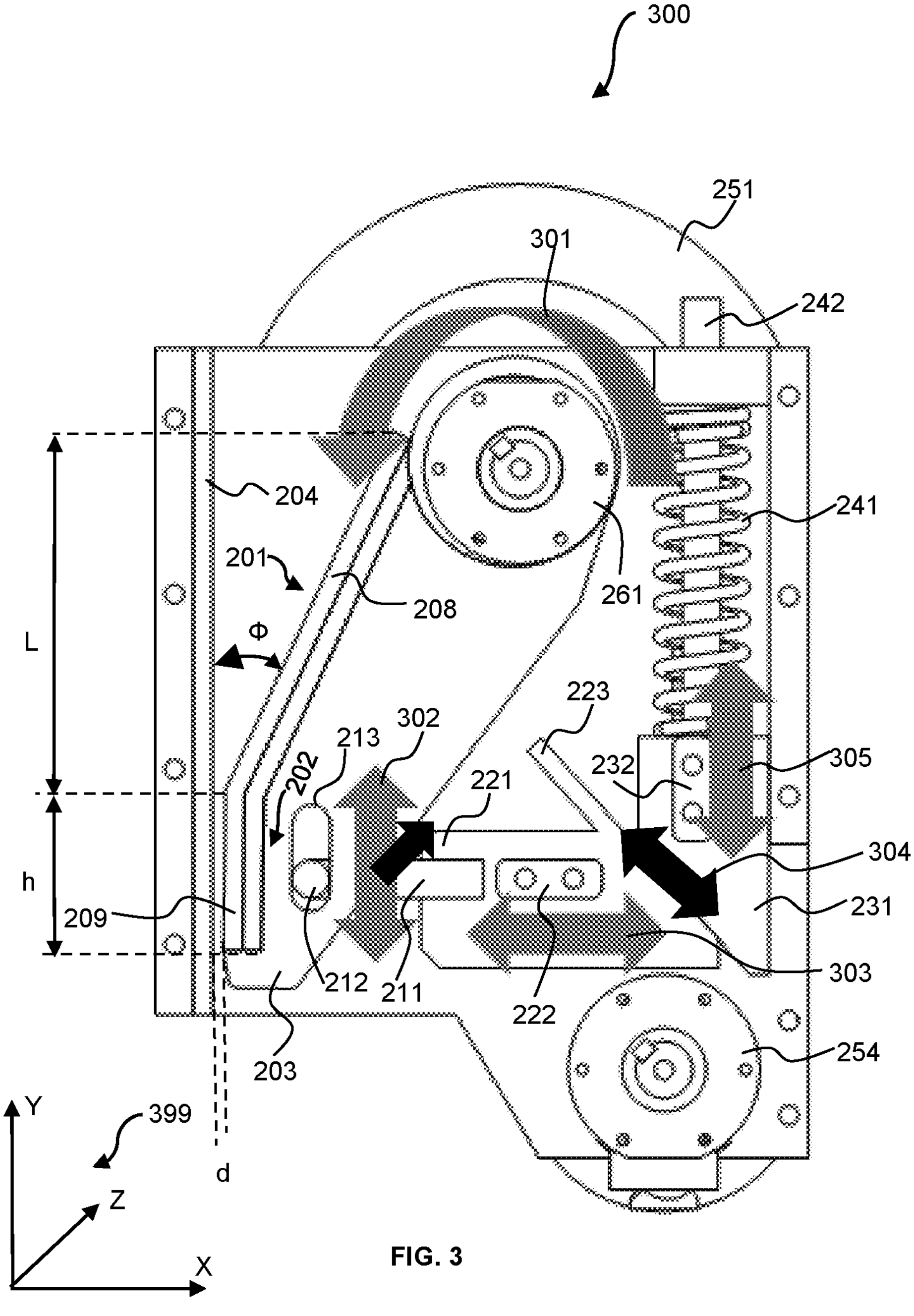
FIG. 3 is a 2D diagram illustrating the operation principle of the compression chamber that provides size adjusting and damage preventing functions to the glass grinder in accordance with an exemplary embodiment of the present invention.

Now referring to FIG. 3, a 2D diagram of a compression chamber 300 that illustrates the operation principle of glass grinder 100 in accordance with an exemplary embodiment of the present invention. FIG. 3 shows movable crushing jaw 203 includes first section 201 and second section 202. First section 201 has a length L, and is affixed with corrugated plate 208. First section 201 and corrugated plate 208 are designed to form an angle @ with a fixed vertical crushing jaw 204. Second section 202 has a length h and is equipped with granular surface 209. Second section 202 and granular plate 209 are parallel to fixed vertical crushing jaw 204. This overall arrangement has the shape of a half funnel. Second section 202 and fixed vertical crushing jaw 204 are parallel to the Y-axis of a XYZ coordinate 399. The distance between granular surface 209 and fixed vertical crushing jaw 204 is d. Distance d can be changed to output various output sizes of the input materials. A size adjustment key 222 is used to vary the distance d. In some preferred embodiments of the invention, if the length of size adjustment key 222 is 53 cm, then the distance d is 3 cm. When the length of adjustment key 222 is 65 cm, the distance d is 10 cm. FIG. 3 also shows that movable crushing jaw 203 includes a slot 213 arranged in the Y-direction. Slot 213 is mated with a nut 212 of toggle bar 211 that connects movable crushing jaw 203 with first adjustment structure 221. Nut 212 is allowed to slide up and down slot 213. First adjustment structure 221 includes slanted slide 223 on which second adjustment structure 231 slides up and down.

In operation, as motor 273 is turned on, input materials are input to the half funnel shape formed by first section 201 and fixed vertical crushing jaw 204. As shown above, during normal operation, when motor 273 is rotated, cylindrical spiral bevel gear set 270 causes pair of driving wheels 253-254 to rotate. Consequently, pair of V belts 255-256 causes pair of fly wheels 251-252 to rotate in a first direction 301. This causes movable crushing jaw 203 to move in both Y-direction and Z-direction against fixed vertical crushing jaw 204. In various aspects of the present invention, the movement in the Y-direction is substantially less than the Z-direction. This is indicated as a direction 302. The length h of second section 202 is designed to smooth out sharp edges of the grinded input materials. This motion causes header 212 to move up and down slot 213, depending on the diameter of the input materials. As such, toggle bar 311 thrusts first adjustment structure 221 along the X-direction in a direction 303. At the same time, second adjustment structure 231 slides up and down along slanted surface 223 in a direction 304. Finally, vertical spring 241 moves up and down along vertical rod 242 in a direction 305. With this operation, input materials such as glass, rocks, ceramics, quarries, plastics, recycles, and the combination thereof having a diameter larger than the angle @ are grinded and smoothed out by corrugated plate 208, granular plate 209, and fixed vertical crushing jaw 204.

Figure 4A:
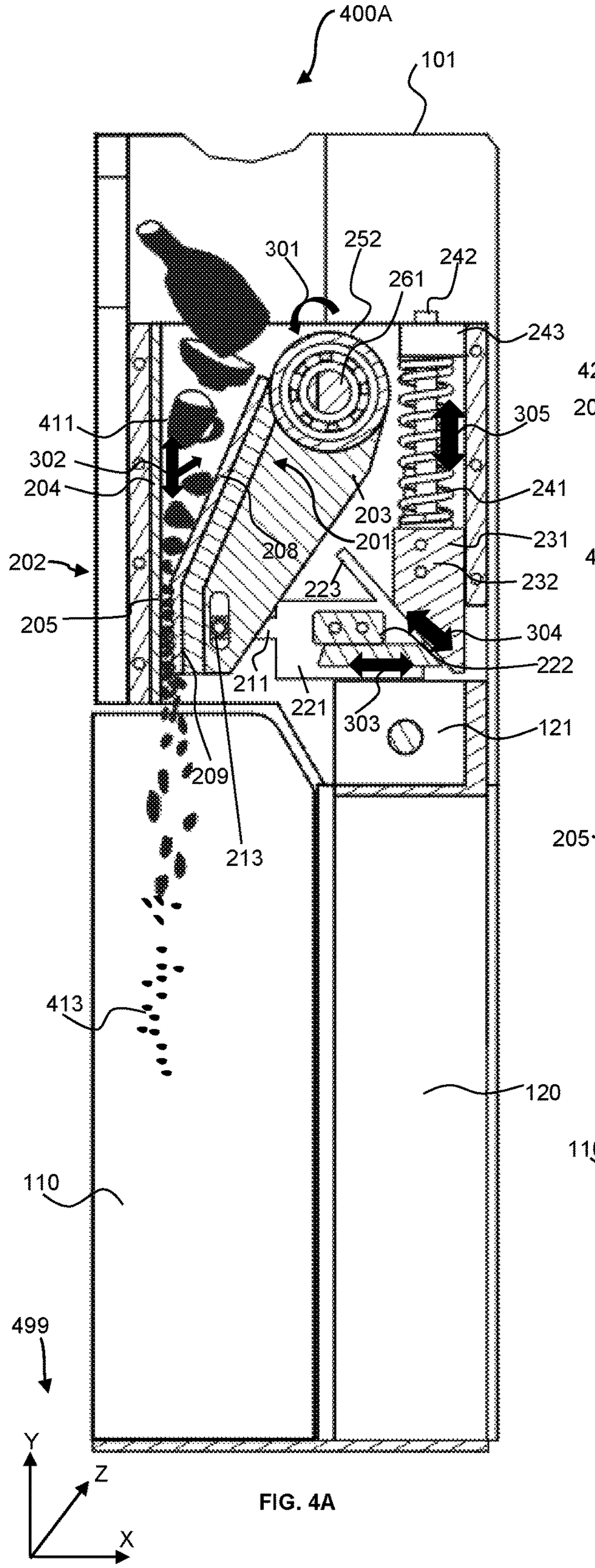
FIG. 4A-FIG. 4B illustrate the normal operation mode and the safe operation mode respectively of the glass grinder in accordance with an exemplary embodiment of the present invention.
Figure 4B:
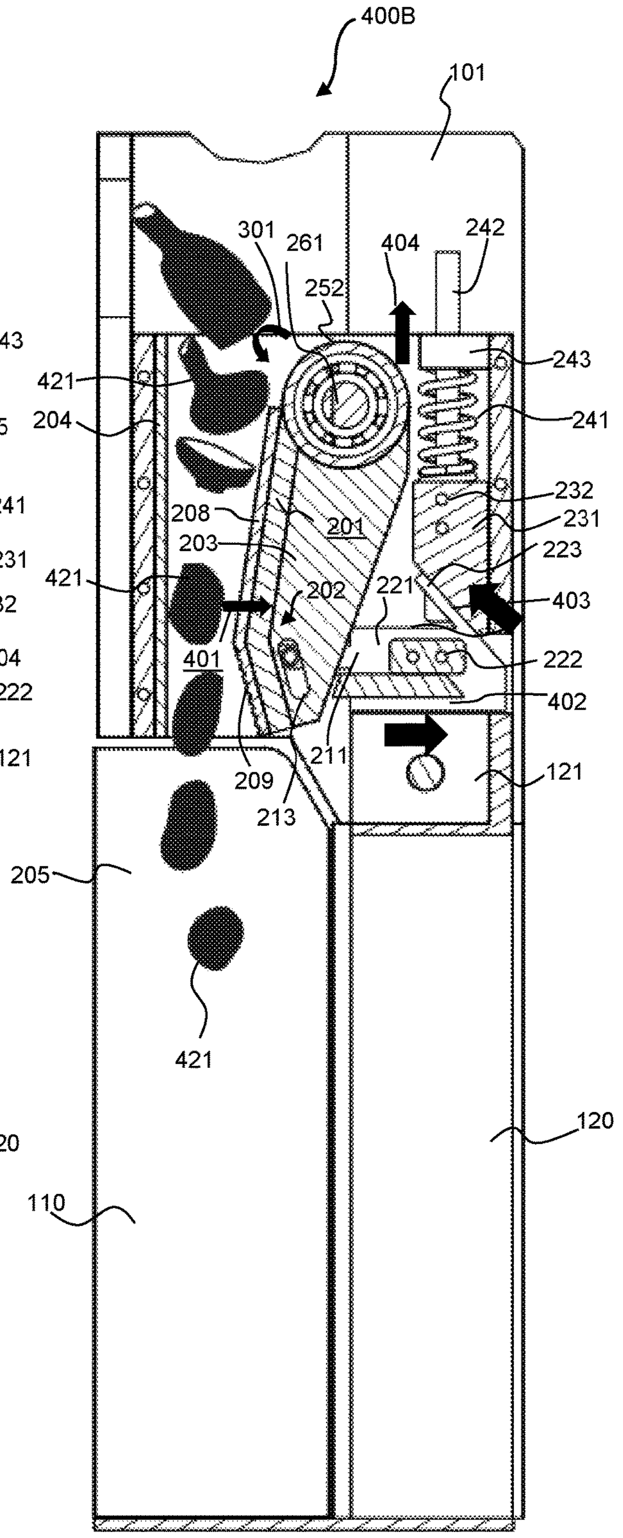

Next, referring to FIG. 4A-FIG. 4B, two different modes of operations of glass grinder 100 are illustrated. In FIG. 4A, a two dimension (2D) diagram 400A illustrates the normal mode operation of glass grinder 100 when the input materials are crushable. In FIG. 4B, a two dimension (2D) diagram 400B illustrates the safe mode operation of glass grinder 100 when the input materials are hard and uncrushable. In other words, FIG. 4A illustrates glass grinder 100 in the normal mode, and FIG. 4B illustrates glass grinder 100 in the safe mode. In the normal mode, first adjustment structure 221, second adjustment structure 231, and safety spring 241 cause movable crushing jaw 203 to operate smoothly, which causes glass grinder 100 to operate smoothly. However, in the safe mode, first adjustment structure 221, second adjustment structure 231, and safety spring 241 cause movable crushing jaw 203 to slide and lock up in order to avoid structure damage to glass grinder 100.

Now referring again to FIG. 3 and FIG. 4A, input materials 411 are input into the funnel shaped mouth (via input opening 102) formed by movable crushing jaw 203 and fixed vertical crushing jaw 204. As motor 273 in a motor housing 120 is turned on by power button 103, spiral bevel gear set 270 causes pair of driving wheels 253-254 to rotate. Consequently, pair of V belts 255-256 causes pair of fly wheels 251-252 to rotate in direction 301. This causes movable jaw 203 to move in both Y-direction and Z-direction in direction 302 with respect to fixed vertical crushing jaw 204. In direction 302 the movement along the Z direction is substantially larger than that in the Y-direction. This motion in direction 302 causes nut 212 to move up and down slot 213, depending on the radius of the input materials 411. As such, toggle bar 311 thrusts first adjustment structure 221 along X-direction 303 of an XYZ coordinate 399. At the same time, second adjustment structure 231 slides up and down along slanted surface 223 in direction 304. Finally, safety spring 241 wiggles up and down along safety spring rod 242 in Y-direction 305. In this normal operation, input materials 411 such as glass, ceramics, rocks, plastics, quarries or other recycle materials having a diameter larger than angle @ are grinded and smoothed out by granular plate 209 and rough surface 215 affixed to fixed vertical crushing jaw 204. In many preferred aspects of the present invention, input materials 411 are glass, then final materials 413 smaller and smoother cullet.

Next, FIG. 4B illustrates the safe operation mode that prevents stress and structural damage to glass grinder 100. When input materials 421 are large and hard that is cannot be grinded by glass grinder 100, they exert a third Newtonian force 401 that causes movable crushing jaw 203 to slide in the X-direction of XYZ coordinate 499. Movable crushing jaw 203 then transfers a force 402 to push first adjustment structure 221 in the same X-direction 402. As such, second adjustment structure 231 is forced to slide upward along slanted surface 223 by a force 403. This compresses and holds safety spring 241 by a vertical force 404. In this safety mode, unnecessary stress and structural damage to glass grinder 100 are avoided. Next, if input materials 421 are removed, then forces 404, 403, 402, and 401 vanish, safety spring 241 returns to its original length and shape, second adjustment structure 231 slides downhill on slanted surface 223. This pushes first adjustment structure 221 to the left, return grinder 100 to its normal operation as described in FIG. 4A.

Figure 5:
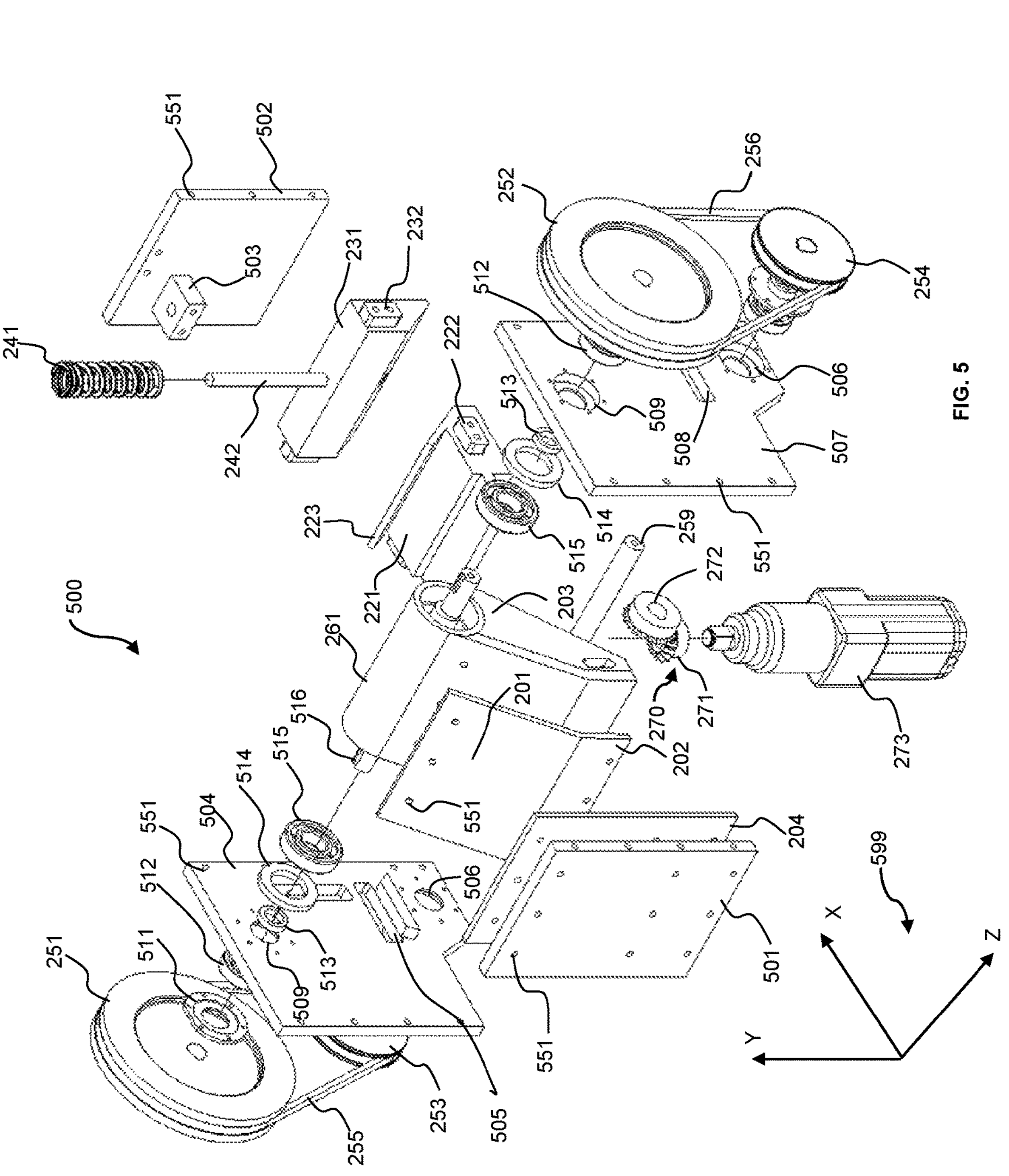
FIG. 5 is an assembly diagram showing the manners the size adjusting glass grinder is assembled in accordance with an exemplary aspect of the present invention.

Next, referring to FIG. 5, an assembly diagram 500 showing main components and the manner slider 100 is assembled in accordance with an exemplary embodiment of the present invention is illustrated. First, all required components described above are obtained with screw holes 551 for assembling together. In various preferred embodiments of the present invention, in the first step, components along an X-direction of an XYZ coordinate system 599 are assembled first. Fixed vertical crushing jaw 204, first section 201, second section 202, movable crushing jaw 203, first adjustment block 221 with distance adjustment key 222 and slanted surface 223, second adjustment block 231 with key 232 and safety spring rod 242 are assembled. Next, components arranged along the Z-direction are assembled. Eccentric shaft 516 is inserted into movable crushing jaw 203. Then, a pair of cushion rings 511, a pair of holding flanges 512, a pair of ring locks 513, a pair of washers 514, and a pair of ball bearings 515 are inserted to eccentric shaft 516. Eccentric shaft 516 is inserted into a pair of eccentric shaft through holes 509. Next, main axle 259 as shown in FIG. 2 is inserted into a pair of driving shaft through holes 506 and coupled to pair of driving wheels 253-254. Spiral bevel gear set 270 is coupled to main axle 259 as shown in FIG. 2. Pair of V-belts 255-256 is coupled to pair of fly wheels 251-252 and pair of driving wheels 253-254. In the Y-direction, safety spring 241 is inserted to safety spring rod 242. Motor 273 is secured to pinion 271. Finally, compression chamber first wall 501, compression chamber second wall with a key lock 503, a third compressing wall 504 with a key lock 505, and a fourth compression chamber wall 507 with a key lock 508 are secured to form housing 101. Screw holes 551 are used with securing means such as nails, screws, bolts, connectors, pins, staples, dowels, ball lock, friction lock, threaded fasteners, nuts, etc.

In many embodiments of the present invention, these components are made of metallic plates, heavy duty steel plates, Ni—Cr alloyed cast iron, etc.

Figure 6:
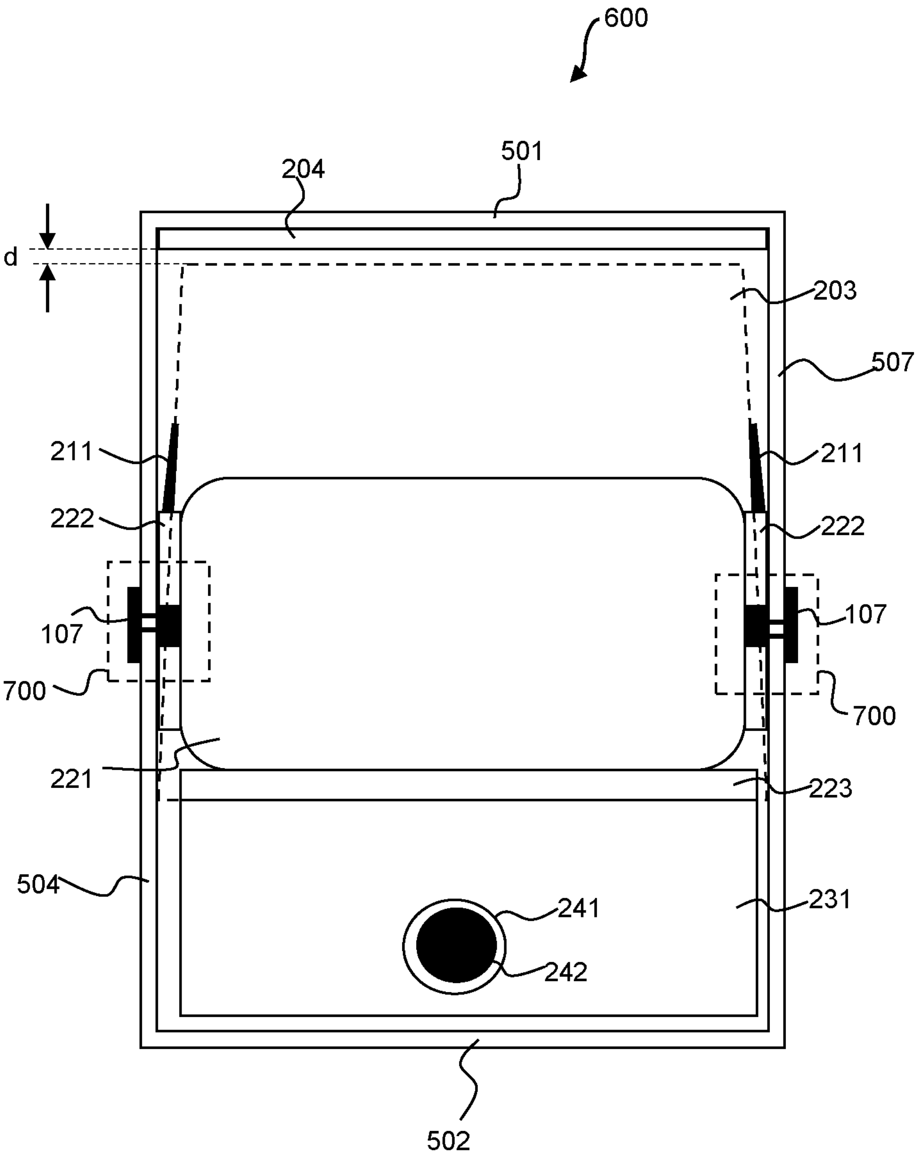
FIG. 6 is a top view of the compression chamber showing the position of the size adjustment keys operative to adjust the diameters of the output materials.
Figure 7A:
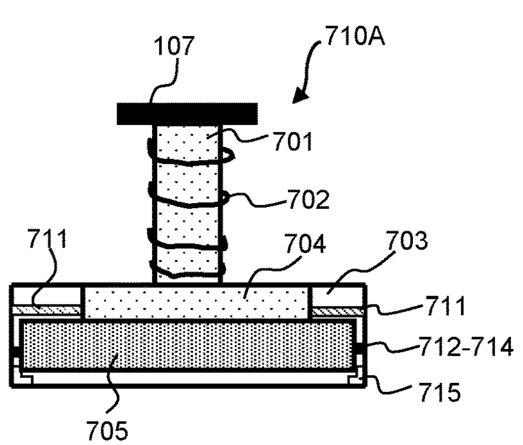
FIG. 7A-FIG. 7B are 2D diagrams illustrate an exemplary operation of the size adjustment keys.
Figure 7A:
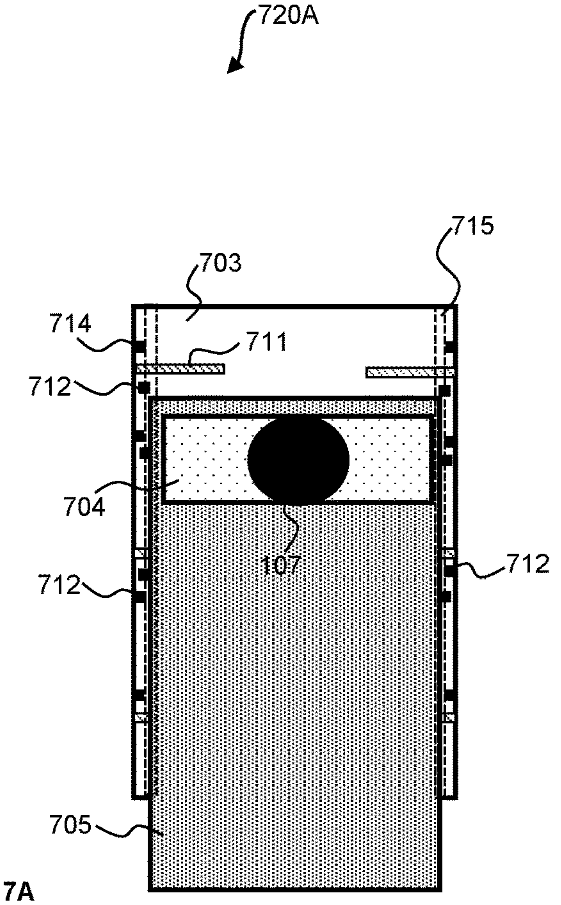
Figure 7B:
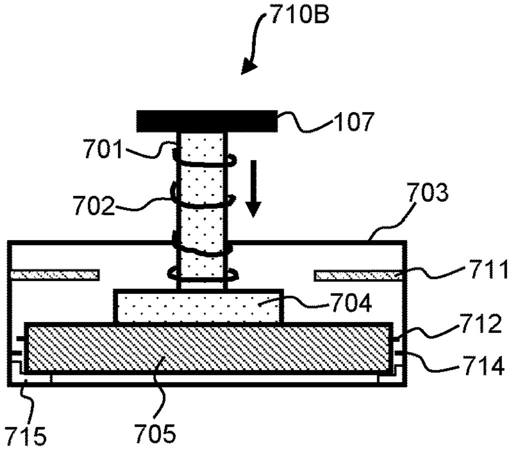
Figure 7B:
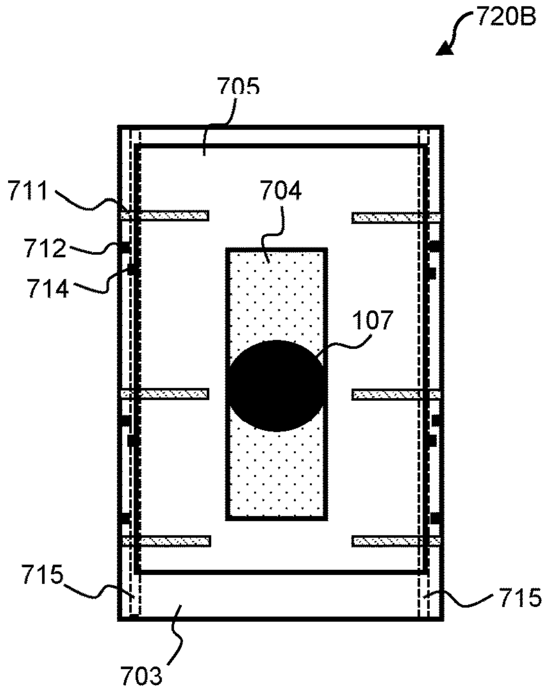

Next referring to both FIG. 6 and FIG. 7A-FIG. 7B, diagrams illustrate an exemplary embodiment and the operations of size adjustment key 222. In FIG. 6, a top view diagram 600 of compression chamber 101 showing the location of size adjustment key 222 is illustrated. Front wall 501, back wall 502, side walls 504 and 507 form the casing for compression chamber 101. From top to bottom of FIG. 6, fixed vertical crushing jaw 204 is affixed to front wall 501. At distance d away from fixed vertical crushing jaw 204, moving crushing jaw 203 is connected to toggle bars 211 and then to size adjustment key 222. Size adjustment key 222 and telescopic length adjustment unit 700 are connected to both sides of second adjustment structure 221 which includes slanted surface 223. Second adjustment structure 231 is designed to slide on slanted surface 223 to ease the counter forces of hard and uncrushable input materials. On top of second adjustment structure 231, safety spring 241 and safety spring rod 242 are located.

In FIG. 7A-FIG. 7B, an exemplary structure of telescopic length adjustment unit 700 is illustrated. A side view diagram 710A shows telescopic length adjustment unit 700 in a lock state after a particular length has been achieved. Telescopic length adjustment unit 700 includes size adjustment knob 107 connected to an axle 701 wrapped around by a spring 702. Axle 701 is connected to a rotatable lock member 704 which is rotated on an inner telescopic member 705. In the lock position, rotatable lock member 704 is locked or stopped by an array of first stoppers 711. In addition, inner telescopic member 705 is firmly locked by array of slider locks 712 and array of stationary locks 714. Array of slider locks 712 are permanently fused to inner telescopic member 705 while array of stationary locks 714 are permanently fused to outer telescopic member 703. In the lock position, array of slider locks 712 and array of stationary locks 714 are mated as shown in a top view diagram 720A. Furthermore, in the lock position, spring 702 lifts inner telescopic member 705 up and out of slide tracks 715 situated on bottom sides of outer telescopic member 703. Because of this, outer telescopic member 703 cannot slide out to extend the length of size adjustment keys 222.

Next referring to FIG. 7B, a side view diagram 710B and a top view diagram 720B show telescopic length adjustment unit 700 in an unlocked state designed to reach a particular length such as 10 mm or 3 mm. First, axle 701 (connected to rectangular lock key 704) is pressed down from size adjustment knob 107 until inner telescopic member 705 touch slide tracks 715. At that moment, arrays of locks 714-715 are separated. Then size adjustment knob 107 is rotated in a clockwise direction until the longest length of rectangular key lock 704 is parallel to that of outer telescopic member 703. In this unlock position, inner telescopic member 705 is slid to any desired length. If the length of size adjusting key 222 is 65 cm, then the distance d is 10 mm. When the length of adjusting key 222 is 53 cm, the distance d is 3 mm. In summary, the diameters of output materials can be changed by simple operations of telescopic length adjustment unit 700.

It is noted that other length changing mechanisms such as linear position ratchets, locking button telescoping tubes, rotator locks, etc. are within the scope of the present invention.

Figure 8:
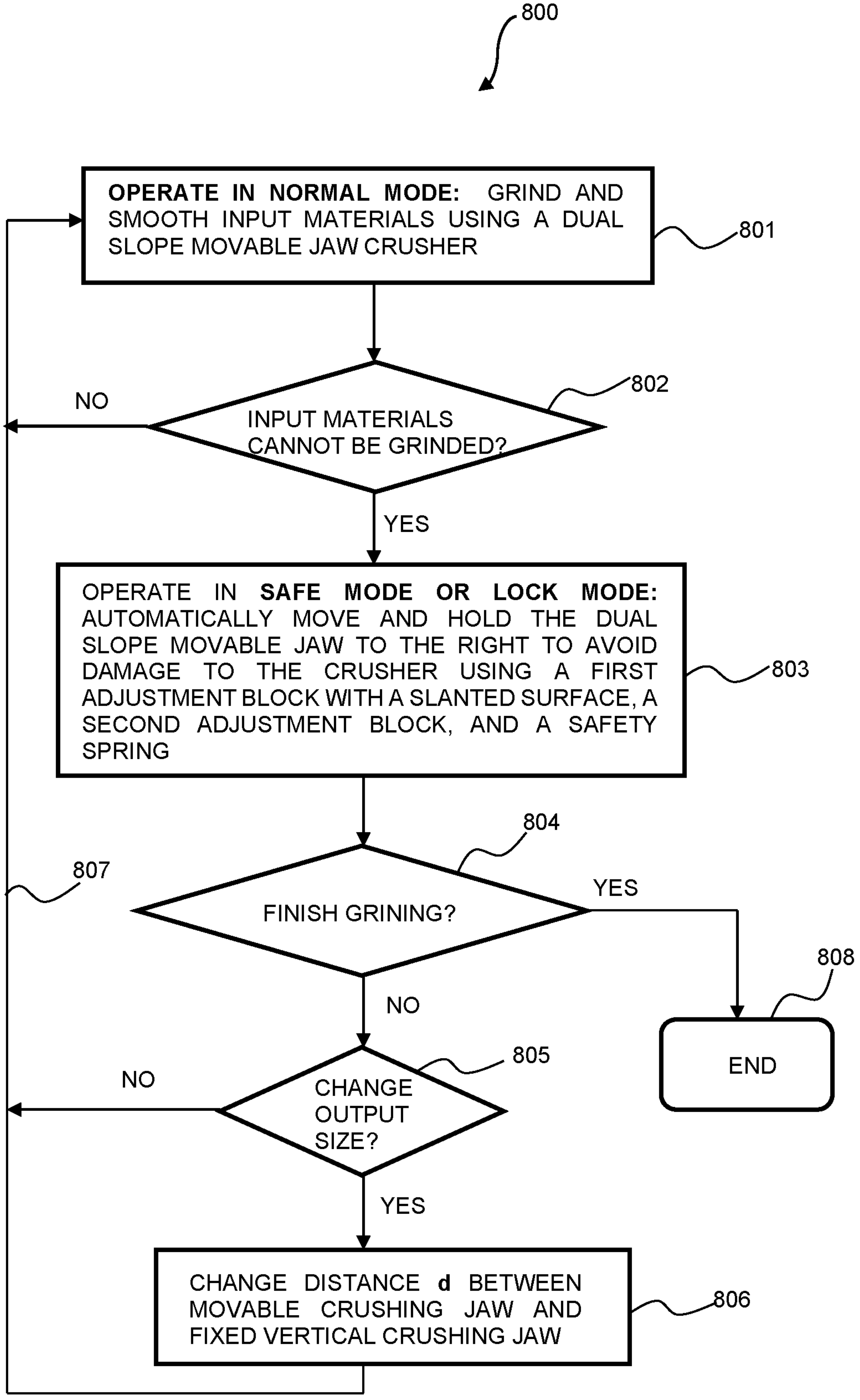
FIG. 8 is a flow chart of a method of grinding input materials in accordance with an exemplary aspect of the present invention.

Finally, referring to FIG. 8, a flowchart of a method 800 for grinding input materials in a normal mode and a safe mode in accordance with an exemplary embodiment of the present invention is illustrated. In the normal mode, when the size and the hardness of the input materials can be grinded, the breaking of the input materials is handled by the compressive force of the compression chamber. In the safe mode, when the size and the hardness of the input materials cannot be grinded, method 800, by means of a simple mechanical structure, transfers the reactive forces of the input materials to move the components of the grinder to the right and store it in a compression spring to avoid stress and structural damage to the grinder.

Now at step 801, input materials are grinded and smoothened out all the sharp edges. Step 801 is realized by dual slope compression chamber 101 including first section 201 affixed to corrugated plate 208, both forming an angle @ with fixed vertical crushing jaw 204. Movable crushing jaw 203 also includes second section 202 affixed with granular plate 209, both are parallel to and separated to vertical fixed jaw 204 by a distance d. Step 801 is further realized by toggle bar 211, first adjustment structure 221 with slanted surface 223, second adjustment structure 231 sliding up and down slanted surface 223 during normal mode, and safety spring 241. These components are described in FIG. 2A-FIG. 2C, FIG. 3, FIG. 4A-FIG. 4B, and FIG. 5.

At step 802, whether input materials can be grinded is determined. If the input materials can be grinded, then move to step 803. In various preferred embodiments of the present invention, step 802 is realized by the shape of safety spring 241. If safety spring 241 is not compressed but continues to oscillate up and down, then the input materials can be grinded. In some embodiments of the present invention, a simple electrical detector detecting the shape of safety spring 241 signals whether the input materials can be grinded or not.

At step 803, grind and smooth out input materials in a normal mode. Step 803 is realized by dual slope compression chamber 101 including first section 201 affixed to corrugated plate 208, both forming an angle @ with fixed vertical crushing jaw 204. Movable crushing jaw 203 also includes second section 202 affixed with granular plate 209, both are parallel to and separated to vertical fixed jaw 204 by a distance d. Step 601 is further realized by toggle bar 211, drawback spring 202, first adjustment structure 221 with slanted surface 223, second adjustment structure 231 sliding up and down slanted surface 223 during normal mode, and safety spring 241. These components are described in FIG. 2A-FIG. 2C, FIG. 3, FIG. 4A-FIG. 4B, and FIG. 5

Next, at step 804, whether the grinding is finished is determined. In various aspects of the present invention, step 804 is realized by another electrical detector designed to detect if input materials stop inputting.

If the grinding has not finished, then go to step 805, determining whether the size of the output materials is changed. If the sizes of the output materials are change then go to step 806.

At step 806, the distance d between the crushing jaws is changed. Step 806 is realized by size adjusting key 222. More particularly, as described above, the distance between granular surface 209 and fixed vertical crushing jaw 204 is d. Distance d can be changed to adapt to various output sizes of the input materials. A size adjusting key 222 is used to vary the distance d. In some aspects of the present invention, size adjusting key 222 is changed by replacing with another size adjusting key having a different length using the assembly instruction shown in FIG. 5. If the length of size adjusting key 222 is 65 cm, then the distance d is 10 mm. When the length of adjusting key 222 is 53 cm, the distance d is 3 mm. In some other aspects of the present invention, the length of size adjusting key 222 is changed by simply activating size adjustment knobs 107 and telescopic length adjustment unit 700 as described in FIG. 6 and FIG. 7A-FIG. 7B. In other aspects of the present invention, the distance d to change the size of the output materials is changed by disassembled glass grinder 100 as described in FIG. 5.

After the distance d has been changed, then follow a path 807 to resume the normal operation as described in step 801 above.

In case the size of the output materials is not needed to change, still continue on path 807 in normal operation mode in step 801.

If the grinding is finished, at step 808, then turn off power of the motor. Step 808 is realized by power button 103 that are electrically connected to motor 273.

It is noted that method 800 is not necessary performed in the above-described order. In various aspects of the present invention, steps 801-808 of method 600 can be performed in different orders so that the objectives of the present invention are achieved.

The scope of the present invention, however, is not limited solely to these specific examples. Various modifications, whether explicitly stated in the specification or not, such as differences in thickness, oxygen pressure in deposition, stoichiometry, and material usage, are conceivable. The scope of the invention encompasses at least as broad as described by the following claims.

Within the scope of the present description, the reference to "an embodiment" or "the embodiment" or "some embodiments" means that a particular feature, structure or element described with reference to an embodiment is comprised in at least one embodiment of the described object. The sentences "in an embodiment" or "in the embodiment" or "in some embodiments" in the description do not therefore necessarily refer to the same embodiment or embodiments. The particular feature, structures or elements can be furthermore combined in any adequate way in one or more embodiments.

EXPLANATION OF REFERENCE NUMERALS

100 exterior housing of the glass grinder
101 compression chamber
102 input opening
103 power button
105 operation LED
105 power button
107 size adjustment knobs
110 output receptacle
111 handles
120 motor container (case)
121 motor fan
200A 2D front view of the compression chamber and motor
200B 2D lateral view of the compression chamber
200C 3D oblique view of the compression chamber
201 first section
202 second section
203 movable crushing jaw
204 fixed (vertical) crushing jaw
208 corrugated plate
209 granular plate
211 toggle arm
212 nut
213 sliding slot
221 first adjustment structure
222 size adjustment key
223 slanted surface
231 second adjustment structure
232 vertical lock key
241 safety spring
242 safety spring rod
243 head screw
251 first fly wheel
252 second fly wheel
253 first driving wheel
254 second driving wheel
255 first V belt
256 second V belt
257 first auxiliary wheel
258 second auxiliary wheel
259 main axle (shaft)
261 eccentric axle (shaft)
270 spiral bevel gear set
271 horizontal bevel gear
272 pinion
273 motor
301 rotation of fly wheels
302 grinding force
303 oscillating force of first adjustment unit
304 sliding up and down
305 oscillating force of the safety spring
311 XY coordinate
401 counter force generated by input materials
402 force that pushes first adjustment unit to the right
403 force that causes second adjustment unit to slide upward
404 force that compresses and holds the safety spring
411 input product to be ground
413 grinded products
423 hard and large products
501 first compression chamber wall
502 second compression chamber wall
503 second lock key
504 third compression chamber wall
505 third lock key

506 driving axle through hole
507 fourth compression chamber wall
508 fourth lock key
509 second eccentric axle through hole
511 cushion ring
512 hold flange
513 ring lock
514 washer
515 ball bearing
516 eccentric axle (shaft)
551 screw holes
599 XYZ coordinate system
700 telescopic length adjustment unit
701 axle
702 spring
703 outer telescoping member
704 rotating lock member
705 inner telescoping member
711 array of first stoppers
712 array of slider locks
714 array of stationary locks
715 array of slider tracks

What is claimed is:

1. A glass grinder device, comprising:

a fixed vertical crushing jaw;

a movable crushing jaw having two different slopes with respect to said fixed vertical crushing jaw;

an eccentric rotating mechanism, mechanically coupled to move said movable jaw in two different directions relative to said fixed vertical crushing jaw so as to grind input materials;

an adjusting mechanism mechanically coupled to assist said movable crushing jaw in grinding when said input materials are crushable and when said input materials are uncrushable, said adjusting mechanism is operable to move and hold said movable crushing jaw along a direction of a force generated by a hardness of said input materials, wherein said adjusting mechanism further comprises a first adjustment structure having a first end and a second end, and wherein said first end is mechanically coupled to said movable crushing jaw so that said first adjustment structure moves in a horizontal direction as said movable crushing jaw is moved by said eccentric rotation mechanism, and wherein said second end further comprises a slanted surface.

2. The device of claim 1, further comprising:

a container, placed below said fixed vertical crushing jaw and said movable crushing jaw, operable to receive final materials after being grinded by said fixed vertical crushing jaw and said movable crushing jaw.

3. The device of claim 1, further comprising a motor coupled to rotate said eccentric rotating mechanism.

4. The device of claim 3, wherein said adjusting mechanism further comprises a second adjustment structure having a third end and a fourth end, and wherein said third end slides on said slanted surface and said fourth end is fixedly coupled to a safety spring rod and a safety spring that is inserted in said safety spring rod.

5. The device of claim 4, wherein said first adjustment structure further comprises a size adjustment key having a length operative to adjust a distance between said fixed vertical crushing jaw and said movable crushing jaw.

6. The device of claim 5, wherein when said length is 53 mm said distance is 3 mm and when said length is adjusted to 65 mm said distance is 10 mm.

7. The device of claim 1, wherein said adjusting mechanism is coupled to said movable crushing jaw by a toggle bar at said first end.

8. The device of claim 7, wherein said toggle bar further comprises a toggle header coupled to slide vertically along a vertical slot.

9. The device of claim 1, wherein said two different slopes further comprise a first slope and a second slope; wherein said first slope forms an angle of less than 90 degrees between said movable crushing jaw and said fixed vertical crushing jaw, and wherein said second slope forms a zero angle between said fixed vertical crushing jaw and said movable crushing jaw.

10. The device of claim 9, wherein said first slope is coupled to a corrugated surface.

11. The device of claim 9, wherein said second slope is coupled to a granular surface.

12. The device of claim 1, wherein said eccentric rotating mechanism further comprises:

a first pair of fly wheels; and a second pair of driven wheels coupled to said first pair of eccentric wheels by a pair of V belts.

13. The device of claim 12, wherein said first pair of fly wheels is coupled together and to said movable jaw by an eccentric shaft.

14. The device of claim 12, wherein said motor is coupled to said pair of fly wheels by a bevel gear.

* * * * *